United States Patent [19]

Mayr et al.

[11] Patent Number: 4,636,486

[45] Date of Patent: * Jan. 13, 1987

[54] POLYMERIZATION CATALYSTS

[75] Inventors: Adolfo Mayr; Ermanno Susa; Antonio Leccese, all of Ferrara; Velmore Davoli, Reggio Emilia; Ettore Giachetti, Milan, all of Italy

[73] Assignee: Montecatini Edison S.p.A., Milan, Italy

[*] Notice: The portion of the term of this patent subsequent to Oct. 1, 2002 has been disclaimed.

[21] Appl. No.: 760,539

[22] Filed: Jul. 30, 1985

Related U.S. Application Data

[60] Division of Ser. No. 152,531, May 22, 1980, Pat. No. 4,544,717, which is a continuation of Ser. No. 543,795, Jan. 24, 1975, abandoned, which is a continuation of Ser. No. 350,525, Apr. 12, 1973, abandoned, which is a continuation of Ser. No. 47,550, Jun. 18, 1970, abandoned.

[30] Foreign Application Priority Data

Jun. 20, 1969 [IT] Italy ............................. 18462 A/69
Jun. 27, 1969 [IT] Italy ............................. 18823 A/69

[51] Int. Cl.$^4$ .............................................. C08F 4/64
[52] U.S. Cl. ..................... 502/121; 502/122; 502/123; 502/124; 502/125; 502/126; 502/127; 502/129; 502/134; 526/125

[58] Field of Search ............... 502/121, 122, 123, 124, 502/125, 126, 127, 134, 129

[56] References Cited

U.S. PATENT DOCUMENTS 4,544,717 10/1985 Mayr et al. ..................... 502/121 X Primary Examiner—Patrick P. Garvin

[57] ABSTRACT

Polymerization catalysts, particularly catalysts for the polymerization of olefins, are disclosed. The catalysts are prepared by mixing (A) an organometallic compound or hydride of a metal belonging to Groups I to III of the Mendelyeev Periodic Table; with (B) the product obtained by contacting (1) an addition product obtained by reacting a di-, tri-, or tetravalent titanium compound with an electron-donor compound, with (2) an anhydrous magnesium halide, in particular anhydrous $MgCl_2$ or $MgBr_2$, which is either preactivated or mixed with the Ti compound under conditions which result in its activation; or by contacting (A) with (B') the product obtained by contacting a di-, tri, or tetravalent Ti compound with an electron-donor compound and a support consisting of an anhydrous Mg halide, in particular $MgCl_2$ or anhydrous $MgBr_2$, which is either preactivated or mixed with the Ti compound and electron-donor under conditions such that the Mg halide is activated.

18 Claims, No Drawings

POLYMERIZATION CATALYSTS

This is a division of application Ser. No. 152,531, filed May 22, 1980 and now U.S. Pat. No. 4,544,717, which in turn is a continuation of Ser. No. 543,795 filed Jan. 24, 1975 and now abandoned, which in turn is a continuation of Ser. No. 350,525 filed Apr. 12, 1973 and now abandoned, which in turn is continuation of Ser. No. 47,550 filed June 18, 1970 and now abandoned.

THE PRIOR ART

It is known to homo- and copolymerize ethylene with various types of catalysts. One of the best known catalysts has been obtained by mixing a titanium or vanadium compound with an organometallic derivative of a metal belonging to Groups I to III of the Mendelyeev Periodic Table.

Our group has also disclosed highly active catalysts for polymerizing olefins obtained by mixing hydrides or organometallic compounds of the Groups I to III metals with products obtained by contacting a titanium trihalide with carriers consisting of preactivated anhydrous Mg halides or with normally inactive anhydrous Mg halides but under conditions such that the anhydrous Mg halides are converted to active form.

THE PRESENT INVENTION

One object of this invention is to provide new and improved, highly active catalysts for the homo- and copolymerization of ethylene with higher alpha-olefins and/or diolefins.

This and other objects are accomplished by the present invention which provides catalysts prepared as stated in the foregoing abstract.

Electron-donor compounds which may be used in preparing the improved catalysts of the invention are characterized in containing one or more electronegative groups such as, for instance, the nitro-, ethero-, ester, amino, and nitrile group in which the electron-donor atom is, in general, a N,O,P,S,As or Sb atom.

The electron-donor compounds are preferably selected from among amines, such as n-butylamine, trimethylamine and triethylamine, pyridine, etc.; P-compounds such as phosphines, oxyhalides of P, alkylphosphoramides, for example tris-N, N-dimethylphosporamide, the trialkyl phosphates and phosphites; stibines and arsines; ethers and thioethers such as ethylphenyl ether, dioxane, tetrahydrofurane and thiophene; esters including ethyl acetate, diethyl fumarate, dihexyl phthalate; nitriles such as benzonitrile, acetonitrile etc.; ketones such as acetone, benzophenon; the nitro-compounds such as nitrobenzene, dinitrocyclohexene, trinitrobenzene; aldehydes such as acetaldehyde and benzaldehyde; alcohols including ethanol and butanol, etc; amides such as urea, formamide, etc.

Particularly representative addition products are: $TiCl_4.1C_4H_8O_2$; $TiCl_4.2C_4H_8O$; $TiCl_4.1C_4H_4S$; $TiCl_4.2C_5H_5N$; $TiCl_4.2CH_3CN$; $[TiCl_4.1POCl_3]_2$; $[TiCl_4.1[(CH_3)_2N]_3PO]$; $[TiCl_4.1CH_3OOOC_2H_5]2$; $TiCl_4.1C_4H_9NH_2$; $TiCl_4.1N(CH_3)_3$; $TiBr_4.2POBr_3$; $TiCl_4.1P(C_6H_5)_3$; $TiCl_4.1C_6H_5NO_2$; $Ti(OC_6H_5)_4.1N(C_2H_5)_3$; $Ti(OC_6H_5)_4.1C_5H_5N$; $Ti(H_2O)_6Cl_3$; $Ti[OC(NH_2)_2]_6Cl_3$; $TiCl_3.3C_5H_5N$; $TiCl_3.3(C_2H_5)_2O$; $TiBr_3.2N(CH_3)_3$; $TiCl_3.2(CH_3)_2CO$; $Ti(C_2H_5OH)_6Cl_3$; $Ti(i-C_4H_9OH)_6Cl_3$; $TiCl_3.1C_4H_8O_2$.

The formulae $C_4H_8O$, $C_4H_8O_2$, $C_4H_4S$, $C_5H_5N$ comprise, respectively, a tetrahydrofurane, a dioxane, a thiophene and a pyridine molecule.

The ratio of Ti compound to complexing compound in the addition product is in general comprised within a very wide range. Particularly high catalytic activities have been obtained by the use of addition products in which said ratio has the value 1.

The preparation of the addition products is generally carried out by adding solutions of the electron-donor compound to solutions of the Ti compound. Usually it is not necessary to heat up the reaction mixture inasmuch as the reaction resulting in the formation of the complexed substance is generally exothermic.

The addition products that are formed are in general colored solid substances which are separated by filtering and drying under vacuum.

Titanium compounds particularly suited for use in the preparation of the addition products according to this invention, are the halides, oxyhalides and alcoholates.

The order in which the reactants for the preparation of the supported catalytic component are added, is not critical. However, it is preferred to contact the carrier with the Ti compound in the presence of the electron-donor compound, or to first contact the electron-donor with the carrier in the active form and then add the titanium compound.

The catalysts of this invention are thus the products formed by mixing a hydride or organometallic compound of a Group I to III metal with the product which results when an addition compound of Ti of the type indicated above, or a di-, tri-, or tetravalent Ti compound and an electron-donor compound, is (or are) brought into contact with a carrier consisting of, or containing, an anhydrous Mg halide, more particularly $MgCl_2$ or $MgBr_2$, either in preactivated form or in non-active form but under conditions designed to activate the Mg halide.

By "active anhydrous magnesium halide" we intend such a halide having one or both of the following characteristics:

(a) in the powder X-ray spectrum thereof the diffraction line corresponding to the most intense line in the spectrum of the normal inert magnesium halide is less intense; and
(b) the active Mg halide has a surface area higher than 3 $m^2/g$ and preferably higher than 10 $m^2/g$ The most active forms of the magnesium halides are characterized in that the X-ray spectra thereof show a broadening of the diffraction line which is normally most intense and/or have a surface area higher than 15 $m^2/g$.

In the case of the anhydrous magnesium chloride, the X-ray spectrum of many active forms is characterized in that the diffraction line appearing at a lattice distance (d) of 2.56 Å, and which is the most intense in the spectrum of the normal $MgCl_2$, is less intense, while in its place a broadened halo appears at a lattice distance within the ranges from 2.56 to 2.95 Å.

Similarly, the X-ray spectra of many active forms of magnesium bromide are characterized in that the diffraction line at d=2.93 Å, which is the most intense in the spectrum of $MgBr_2$ of the normal type, is less intense, while in its place a broadened halo appears within the range of d=2.80 to 3.25 Å.

According to a preferred method, the supported catalytic component is prepared by co-grinding anhydrous Mg halide and the titanium addition compound, or with a di-, tri-, or tetravalent Ti compound and an electron-donor compound, according to known technologies, for grinding times and under conditions sufficient to convert the anhydrous Mg halide into an active form having the above defined characteristics.

The grinding is preferably carried out in a ball mill or grinder operating according to the dry method, in the absence of liquid inert diluents.

The supported catalytic component may be prepared, also, by simply mixing, in the solid state, the Ti-complex, or a di-, tri-, or tetravalent Ti compound and an electron-donor compound, with anhydrous Mg halide which has been preactivated.

The active anhydrous Mg halides can be obtained by methods other than grinding. One such method consists in starting with a compound of the formula RMgX, in which R is a hydrocarbon radical, and X is a halogen, and effecting a disproportioning thereof by known methods, or by treatment with halogenated compounds such as, for instance, anhydrous gaseous hydrochloric acid.

Another method consists in thermally decomposing, under reduced pressure, coordination complexes of the anhydrous Mg halides with Lewis bases or acids or by decomposing the Mg halides in the form of compounds containing organic crystallization solvents. For instance, $MgCl_2$ in an active form may be obtained by this method from its solutions in ethanol.

The quantity of the Ti addition compound or complex useful in preparing the supported catalytic component may be comprised within a wide range the lower limit of which may be below 0.01% by weight with respect to the carrier, and the upper limit of which may reach values above 30% by weight and more.

Particularly good results are obtained, as far as concerns the yield of polymer on the amount of catalyst used, with reference to both the Ti compound and the carrier, when the amount of the Ti compound present on the carrier is between 1% and 10% by weight.

Hydrides and organometallic compounds particularly suited for the preparation of the catalysts are:
$Al(C_2H_5)_3$, $Al(C_2H_5)_2Cl$, $Al(iC_4H_9)_3$, $Al(iC_4H_9)_2Cl$, $Al_2(C_2H_5)_3Cl$, $Al(C_2H_5)_2H$, $Al(iC_4H_9)_2H$, $Al(C_2H_5)_2Br$, $LiAl(iC_4H_9)_4$, $LiiC_4H_9$, etc.

The molar ratio between the Al compound and the Ti compound is not critical. When the catlaysts are used in the polymerization of ethylene, such ratio is preferably comprised between 50 and 1000.

The catalysts of this invention are used in the homo- and copolymerization of olefines according to the known techniques, that is, in the liquid phase, in the presence or absence of an inert solvent, or in the gaseous phase.

The temperature of the polymerization may be comprised between −80° and +200° C., but preferably is comprised between 50° and 100° C., operating at atmospheric pressure or at a pressure greater than atmospheric pressure. The regulation of the molecular weight of the polymer during the polymerization is achieved by known expedients, for instance by operating in the presence of alkyl halides, organometallic Zn or Cd compounds, or hydrogen.

As is well known, the activity of the known catalysts obtained from compounds of transition metals and organometallic compounds of the metals of the I, II and III Groups, is considerably reduced when hydrogen or other chain-transfer agents are included in the polymerization zone for regulating the molecular weight of the polymer produced.

In the case of the catalysts according to this invention, however, it has been found, and this constitutes another advantageous aspect of the invention, that it is possible to regulate the molecular weight of the polymer even down to low or very low values without any appreciable reduction in the activity of the catalysts.

For example, when ethylene is polymerized in contact with the present catalysts, it is possible to regulate the molecular weight of the polyethylene within a practical range corresponding to values of the intrinsic viscosity in tetralin(tetrahydronaphthalene) at 135° C., comprised between about 1.5 and 3 dl/g, without the yield in polymer of the particularly active catalysts dropping to values below which it would be necessary, to carry out a purification of the polymer for removing catalytic residues therefrom, at the end of the polymerization.

The polyethylene obtained with the new catalysts is a substantially linear and highly crystalline polymer with density values equal to or greater than 0.96 g/cc, having high processability characteristics which in general are higher than those of the polyethylene obtained with the normal Ziegler-type catalysts. The content in Ti of the nonpurified polymer is in general less than 20 ppm.

The invention will be further illustrated by the following examples which are not intended to be limiting.

Unless otherwise specifically indicated, the percentages reported in the examples are by weight; the intrinsic viscosity of the polymer was measured in tetralin at 135° C.

EXAMPLE 1

In a centrifugal ball mill were ground for three (3) hours in an atmosphere of inert gas 10 g of anhydrous $MgCl_2$ together with 0.55 g of the addition compound $TiCl_4.1$ dioxane.

The product discharged has a Ti content of 0.79% and a superficial area of $\simeq 13$ m$^2$/g Into a 1.8 liter autoclave were then introduced 1000 cc of heptane and 2 g of Al triisobutyl. The temperature was brought up to 75° C. and there were introduced 0.046 g of the previously prepared ground product. Thereupon, the pressure was brought up to 3 atm. with hydrogen and then to 13 atm. with ethylene. Thereby the temperature rose to 85° C.; the pressure was kept constant throughout the polymerization by feeding ethylene.

After 4 hours there were discharged 167 g of polymer having an intrinsic viscosity in tetralin at 135° C. $(\eta) = 2.3$ dl/g and an apparent density of 0.275 g/cc.

The yield in polymer amounted to 699.000 g/g of Ti

EXAMPLE 2

10 g of anhydrous $MgCl_2$ and 0.94 g of $TiCl_4.1P(C_6H_5)_3$ compound were ground under the same conditions as those of Example 1. The Ti content of the ground product amounted to 0.44% by weight and its superficial area was $\simeq 13$ m$^2$/g.

By using 0.071 g of the ground product and operating under the same polymerization conditions as in Example 1, there were obtained 396 g of polyethylene having an intrinsic viscosity of 2.0 dl/g and an apparent density equal to 0.403 g/cc. The yield in polymer amounted to 527,000 g/g of Ti.

EXAMPLE 3

5 g of anhydrous $MgCl_2$ and 0.17 g of the compound $TiCl_4.1$ thiophene were ground together under the same conditions as those in Example 1.

The Ti content of the ground product amounted to 0.47% by weight and its superficial area was $\simeq 13$ m$^2$/g.

By using 0.186 g of the ground product and operating under the same polymerization conditions as those of Example 1, there were obtained 312 g of polyethylene having an intrinsic viscosity of 2.6 dl/g and an apparent density of 0.352 g/cc. The yield in polymer amounted to 331,000 g/g of Ti.

EXAMPLE 4

10 g of anhydrous $MgCl_2$ and 0.5 g of the compound $TiCl_3.1$ dioxane were ground under the same processing conditions as those of Example 1.

The Ti content of the ground product amounted to 1.15% and its superficial area was $\simeq 13$ m$^2$/g.

Using 0.137 g of the ground product and operating under the same conditions as those of Example 1, there were obtained 435 g of polyethylene having an intrinsic viscosity of 3.0 dl/g and an apparent density of 0.344 g/cc. The yield in polymer amounted to 272,000 g/g of Ti.

EXAMPLE 5

10 g of anhydrous $MgBr_2$ and 0.5 g of the compound $TiCl_4.1$ dioxane were ground under the same conditions as those of Example 1.

Using 0.046 g of the ground product and operating under the same polymerization conditions as those used in Example 1, there was obtained a very high yield in polyethylene having an intrinsic viscosity of 2.6 dl/g and an apparent density of 0.34 g/cc.

EXAMPLE 6

10 g of anhydrous $MgCl_2$ and 0.65 g of the compound $TiCl_4.1C_6H_5NO_2$ were ground under the same conditions as described in Example 1.

Using 0.074 g of the ground product and operating under the same conditions as those of Example 1, there were obtained 204 g of polyethylene having an intrinsic viscosity of 2.1 dl/g. The yield in polymer was 265,000 g/g of Ti.

EXAMPLE 7

10 g of anhydrous $MgCl_2$ and 0.54 of the compound $TiCl_4.1C_4H_9NH_2$ were ground under the same conditions as those of Example 1. The Ti content of the ground product amounted to 0.7% and its superficial area was $\simeq 13$ m$^2$/g.

Using 0.097 g of the ground product and under the polymerization conditions indicated in Example 1 there were obtained 232 g of polyethylene having an intrinsic viscosity of 2.6 dl/g and an apparent density of 0.328 g/cc. The yield in polymer amounted to 331,000 g/g of Ti.

EXAMPLE 8

7.1 g of $MgCl_2$ and 1.2 g of the compound $TiCl_3.4$ pyridine were ground under the same conditions as those of Example 1.

Using 0.085 g of the ground product and operating under the conditions of Example 1 there were obtained 325 g of polyethylene having an intrinsic viscosity 2.6 dl/g. The yield in polymer amounted to 340,000 g/g of Ti.

EXAMPLE 9

In a centrifugal ball mill were ground for 3 hours in an atmosphere if inert gas 20 g of anhydrous $MgCl_2$ together with 0.8 of $TiCl_4$ and 0.55 g of p-chlorophenol. The product coming out of the mill had a Ti content of 0.79% and its superficial area was $\simeq 13$ m$^2$/g.

Into an autoclave of 1.8 liter capacity, were introduced 1000 cc of n-heptane and 2 g of Al triisobutyl. Thereupon the temperature was brought up to 75° C. and there were introduced 0.061 g of the catalytic component herein described. The pressure in the autoclave was then brought up to 3 atm. with hydrogen and then to 13 atm. with ethylene. Thereby the temperature rose to 85° C. and the pressure was maintained constant by feeding in ethylene.

After 4 hours, 388 g of a polymer having an intrinsic viscosity of 1.8 dl/g and an apparent density of 0.472 g/cc were discharged from the autocalve. The yield in polymer amounted to 800.000 g/g of Ti.

EXAMPLE 10

20 g of anhydrous $MgCl_2$ were ground together with 2.17 g of p-chlorophenol and 0.8 g of $TiCl_4$, under the same conditions as those of Example 1. The Ti content of the ground product amounted to 0.82% b.w. and its superficial area was $\simeq 13$ m$^2$/g.

Using 0.073 g of the ground product and operating under the same polymerization conditions as those of Example 9, there were obtained 473 g of polyethylene having an intrinsic viscosity of 1.9 dl/g and an apparent density of 0.477 g/cc. The yield in polymer amounted to 790,000 g/g of Ti.

EXAMPLE 11

Example 10 was repeated except that 13.02 g of-chlorophenol were used.

The Ti content of the ground product amounted to 0.36% b.w. and its superficial area was $\simeq 13$ m$^2$/g.

Using 0.136 g of the ground product there were obtained 368 g of polyethylene with an intrinsic viscosity of 2.1 dl/g. The yield in polymer amounted to 441,000 g/g of Ti.

EXAMPLE 12

20 g of anhydrous $MgCl_2$ were ground under the same conditions as those of Example 9, in the presence of 1.01 g of isopropanol and 0.8 g of $TiCl_4$. The Ti content of the ground product was 1.10% and its superficial area was $\simeq 13$ m$^2$/g.

Using 0.071 g of the ground product there were obtained 310 g of a polyethylene having an intrinsic viscosity of 2.2 dl/g and an apparent density of 0.351 g/cc. The yield in polymer amounted to 400,000 g/g of Ti.

EXAMPLE 13

20 g of anhydrous $MgCl_2$ were ground under the same conditions as those of Example 9, together with 0.64 g of $TiCl_3$ of the composition 3 $TiCl_3.AlCl_3$ and with 0.53 g of p-chlorophenol.

The content of the ground product amounted to 0.43% and its superficial area was $\simeq 13$ m$^2$/g.

Using 0.027 g of the ground product and operating under the same conditions as those of Example 9, there were obtained 163 g of polyethylene having an intrinsic viscosity of 2.0 dl/g and an apparent density of 0.348 g/cc. The yield in polymer amounted to 1,420,000 g/g of Ti.

EXAMPLE 14

Example 13 was repeated except that anhydrous MgBr$_2$ (20 g) was used as the carrier.

By using 0.020 g of the ground product there were obtained 120 g of a polyethylene having an intrinsic viscosity of 1.8 dl/g and an apparent density of 0.380 g/cc. The yield in polymer amounted to 1,510,000 g/g of Ti.

EXAMPLE 15

20 g of anhydrous MgCl$_2$ were ground under the same conditions as those applied in Example 9, together with 0.37 g of dioxane and 0.8 g of TiCl$_4$. The Ti content of the ground product amounted to 1.00% and its superficial area was $\simeq$13 m$^2$/g.

Using 0.026 g of the ground product and operating under the same conditions as those of Example 9, there were obtained 239 g of a polyethylene having an intrinsic viscosity of 1.7 dl/g and an apparent density of 0.319 g/cc. The yield in polymer amounted to 990,000 g/g of Ti.

EXAMPLE 16

Example 15 was repeated except that 8.80 g of dioxane were used. The Ti content of the ground product amounted to 0.76% and its superficial area was $\simeq$13 m$^2$/g.

Using 0.089 g of the ground product, there were obtained 124 g of polyethylene with an intrinsic viscosity of 2.4 dl/g and an apparent density=0.364 g/cc. The yield in polymer amounted to 188,000 g/g of Ti.

EXAMPLE 17

20 g of anhydrous MgCl$_2$ together with 0.61 g of thiophene and 0.8 of TiCl$_4$ were ground under the same conditions as in Example 9. The Ti content of the ground product amounted to 0.82% and its superficial area was $\simeq$13 m$^2$/g.

Using 0.045 g of the ground product and operating under the same conditions as those of Example 9, there were obtained 280 g of polyethylene having an intrinsic viscosity of 2.0 dl/g while the yield in polymer amounted to 767,000 g/g of Ti.

EXAMPLE 18

Example 17 was repeated except that 0.55 g of benzenealdehyde was used as the complexing agent. The Ti content of the ground product amounted to 0.85% and its superficial area was $\simeq$13 m$^2$/g.

Using 0.073 g of the ground product there was obtained 298 g of polyethylene having an intrinsic viscosity of 2.6 dl/g and an apparent density of 0.364 g/cc. The yield in polymer amounted to 534,000 g/g of Ti.

EXAMPLE 19

Example 18 was repeated except that 0.24 g of acetone was used as the complexing agent.

The Ti content of the ground product amounted to 0.85% and its superficial area was $\simeq$13 m$^2$/g.

Using 0.116 g of the ground product there were obtained 379 g of polyethylene with an intrinsic viscosity of 2.4 dl/g and an apparent density of 0.380 g/cc. The yield in polymer amounted to 379,000 g/g of Ti.

EXAMPLE 20

10 g of anhydrous MgCl$_2$ were ground under the same conditions as those of Example 1 together with 0.41 g of TiCl$_3$ of the composition 3 TiCl$_3$.AlCl$_3$ and 0.18 g of naphthadioxane. The Ti content of the ground product amounted to 0.32% and its superficial area was $\simeq$13 m$^2$/g.

Using 0.216 g of the ground product and by operating under the same conditions as those of Example 9, there were obtained 306 g of polyethylene having an intrinsic viscosity of 2.7 dl/g and an apparent density amounting to 0.330 g/g. The yield in polymer amounted to 537,000 g/g of Ti.

EXAMPLE 21

Example 9 was repeated except that the magnesium chloride and p-chlorophenol were first ground for 2 hours, in the absence of TiCl$_4$, and that the product thus obtained was then re-ground for another 2 hours in the presence of TiCl$_4$. The Ti content of the ground product amounted to 0.79% and its superficial area was $\simeq$13 m$^2$/g.

By using 0.0616 g of the ground product thus prepared there were obtained 388 g of a polyethylene having an intrinsic viscosity of 1.8 dl/g and an apparent density of 0.412 g/cc. The yield in polymer amounted to 800,000 g/g of Ti.

EXAMPLE 22

Example 9 was repeated but with the difference that first the magnesium chloride was ground for 2 hours in the presence of TiCl$_4$ and that, thereafter, the product thus obtained, was reground for another 2 hours in the presence of p-chlorophenol.

Using 0.0754 g of the ground product thus obtained, there were obtained 375 g of polyethylene having an intrinsic viscosity of 1.9 dl/g and an apparent density of 0.357 g/cc. The yield in polymer amounted to 478,000 g/g of Ti.

Although the Group I to III metal derivative used in the examples, as one catalyst-forming component, was aluminum triisobutyl, equivalent results are obtained when other derivatives of said metals are used, such as the hydrides and organometallic compounds specified herein.

Some changes can be made in practicing the invention, without departing from its spirit. Therefore, we intend to include in the scope of the appended claims all modifications and variations which will be obvious to those skilled in the art from the description and working examples given herein.

What is claimed is:

1. Polymerization catalysts prepared by mixing
    (A) a catalyst-forming component which is a hydride or organo-metallic compound of a metal belonging to Groups I to III of the Mendelyeev Periodic Table with
    (B) a supported catalyst-forming component which is the product obtained by contacting (1) an addition compound of di-, tri-, or tetravalent titanium selected from the group consisting of the halides, oxyhalides and alcoholates containing at least one molecule of an electron-donor bound to at least one Ti atom, or such a di-, tri-, or tetravelent titanium compound and a electron-donor compound, with (2) a support comprising an activated anhydrous magnesiunm dichloride characterized in that, in its X-rays powder spectrum, the diffraction line appearing at a lattice distance (d) of 2.56 Å, and which is most intense in the X-rays powder spectrum of the normal $MgCl_2$ is less intense and in its place a broadened halo appears at a lattice distance within the range of (d)=2.56 to 2.95 Å.

2. Polymerization catalysts prepared by mixing
(A) a catalyst-forming component which is a hydride or organo-metallic compound of a metal belonging to Groups I to III of the Mendelyeev Periodic Table with
(B) a supported catalyst-forming component which is the product obtained by contacting (1) an addition compound of di-, tri-, or tetravalent titanium selected from the group consisting of the halides, oxyhalides and alcoholates containing at least one molecule of an electron-donor compound bound to at least one Ti atom, or such a di-, tri-, or tetravalent titanium compound and an electron-donor compound, with (2) a support comprising an activated anhydrous magnesium dibromide characterized in that the diffraction line appearing at a lattice distance (d)=2.93 Å which is most intense in the X-rays powder spectrum of the normal magnesium dibromide is less intense and in its place a broadened halo appears at a lattice distance within the range of d=2.80 to 3.25 Å.

3. Polymerization catalysts prepared by mixing
(A) a catalyst-forming component which is a hydride or organo-metallic compound of a metal belonging to Groups I to III of the Mendelyeev Periodic Table, with
(B) a supported catalyst-forming component comprising the product obtained by contacting (1) an addition compound of a tri- or tetravalent titanium compound selected from the group consisting of the halides and alcoholates containing at least one molecule of an electron-donor compound or such tri-, or tetravalent titanium compound and an electron-donor compound, with (2) a support comprising an anhydrous magnesium dichloride or dibromide in an active form, the magnesium dichloride showing an X-ray powder spectrum in which the most intense diffraction line appearing in the spectrum of normal non-activated magnesium dichloride at the lattice distance of 2.56 Å is less intense, while in its place a broadened halo appears at a lattice distance within the range from 2.56 Å to 2.95 Å, the magnesium dibromide showing an X-ray powder spectrum in which the most intense diffraction line appearing in the spectrum of normal non-activated magnesium dibromide at the lattice distance of 2.93 Å is less intense while in its place a broadened halo appears at a lattice distance within the range of from 2.8 to 3.25 Å.

4. A supported component of catalysts for the polymerization of olefins comprising the product obtained by contacting (1) an addition compound of a tri- or tetravalent titanium compound selected from the group consisting of the halides and alcoholates containing at least one molecule of an electron-donor compound, or such tri- or tetravelent titanium compound and an electron-donor component with (2) a support comprising an anhydrous magnesium dichloride or dibromide in an active form, the magnesium dichloride showing an X-ray powder spectrum in which the most intense diffraction line appearing in the spectrum of normal non-activated magnesium dichloride at the lattice distance of 2.56 Å is less intense, while in its place a broadened halo appears at a lattice distance within the range from 2.56 to 2.95 Å, the magnesium dibromide showing an X-ray powder spectrum in which the most intense diffraction line appearing in the spectrum of normal non-activated magnesium dibromide at the lattice distance of 2.93 Å is less intense while in its place a broadened halo appears at a lattice distance within the range from 2.8 to 3.25 Å.

5. A polymerization catalyst according to claim 3, characterized in that the electron-donor compound contains at least one electro-negative group wherein the electron-donor atom (or atoms) is (or are) selected from the group consisting of O, N, P, S, As and Sb.

6. A polymerization catalyst according to claim 5, further characterized in that the electron-donor compound is selected from the group consisting of p-chlorophenol, dioxane, naphthadioxane, thiophene, benzenealdehyde and acetone.

7. A polymerization catalyst according to claim 3, characterized in that the molar ratio Ti compound/electron-donor compound is equal to 1.

8. A polymerization catalyst according to claim 3, characterized in that the Ti compound is present in the support in a quantity comprised between 0.01% and 30% by weight, with reference to the support.

9. A polymerization catalyst according to claim 8, further characterized in that the Ti compound is present in the support in a quantity comprised between 1% and 10% by weight, with reference to the support.

10. A polymerization catalyst according to claim 3, characterized in that component (A) is triethyl aluminum.

11. A polymerization cayalyst according to claim 3, characterized in that component (A) is triisobutyl aluminum.

12. A supported catalyst component according to claim 4 in which the electron-donor compound is selected from the compounds containing an O, N, P, S, As and Sb electron-donor atom.

13. A supported catalyst component according to claim 4, in which the electron-donor compound is an ester.

14. A supported catalyst component according to claim 4 obtained by contacting the titanium addition compound or the titanium compound and the electron-donor compound with a preactivated Mg dihalide.

15. A supported catalyst component according to claim 4 in which the titanium compound is $TiCl_4$, the electron-donor compound is an ester and the Mg dihalide is Mg dichloride.

16. A supported catalyst component according to claim 4, in which the titanium compound is $TiCl_4$, the electron-donor compound is an ester and the Mg dihalide is Mg dibromide.

17. A supported catalyst component according to claim 4, in which the titanium compound is $TiCl_3$, the electron-donor compound is an ester and the Mg dihalide is Mg dichloride.

18. A supported catalyst component according to claim 4, in which the titanium compound is $TiCl_3$, the electron-donor compound is an ester and the Mg dihalide is Mg dibromide.

* * * * *